(12) United States Patent
Kama et al.

(10) Patent No.: US 10,654,362 B2
(45) Date of Patent: May 19, 2020

(54) TRAVELING APPARATUS

(71) Applicant: TOYOTA JIDOSHA KABUSHIKI KAISHA, Toyota-shi, Aichi-ken (JP)

(72) Inventors: Takeshi Kama, Nagakute (JP); Makoto Mori, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/686,658

(22) Filed: Aug. 25, 2017

(65) Prior Publication Data
US 2018/0072155 A1    Mar. 15, 2018

(30) Foreign Application Priority Data
Sep. 13, 2016    (JP) .................. 2016-178982

(51) Int. Cl.
*B60K 31/00*     (2006.01)
*B62K 15/00*     (2006.01)
(Continued)

(52) U.S. Cl.
CPC .............. *B60K 31/00* (2013.01); *B62K 3/002* (2013.01); *B62K 5/027* (2013.01); *B62K 5/06* (2013.01);
(Continued)

(58) Field of Classification Search
CPC ............ B60G 2300/40; B60G 2300/37; B60G 2300/12; B60W 2300/46; B60Y 2200/43;
(Continued)

(56) References Cited

U.S. PATENT DOCUMENTS 4,794,999 A * 1/1989 Hester .................. A61G 5/061
                                                           180/8.2
5,372,211 A * 12/1994 Wilcox ............... B62D 57/028
                                                           180/8.2
(Continued)

FOREIGN PATENT DOCUMENTS

JP     01-106717 A    4/1989
JP     2005-231415 A  9/2005
(Continued)

OTHER PUBLICATIONS

JP2012076671 Description Translation (Year: 2012).*
JP2012076671 Claims Translation (Year: 2012).*

*Primary Examiner* — James A Shriver, II
*Assistant Examiner* — Vaughn Coolman
(74) *Attorney, Agent, or Firm* — Sughrue Mion, PLLC

(57) ABSTRACT

Provided is a traveling apparatus including an adjusting mechanism configured to adjust a wheel base length between a front wheel and a rear wheel by an action of the user being transmitted, a command accept unit configured to accept a command for traveling forward or backward from the user, and a control unit configured to, while the command accept unit accepts the command for traveling forward, control a driving unit to drive the traveling apparatus to travel forward based on a forward target speed associated with the wheel base length in such a way that the greater the wheel base length, the greater the forward target speed becomes, and while the command accept unit accepts the command for traveling backward, control the driving unit to drive the traveling apparatus to travel backward based on a backward target speed associated with the wheel base length.

6 Claims, 10 Drawing Sheets

(51) Int. Cl.
  *B62K 5/06* (2006.01)
  *B62K 5/027* (2013.01)
  *B62K 3/00* (2006.01)

(52) U.S. Cl.
  CPC .... *B62K 15/006* (2013.01); *B60K 2031/0091* (2013.01); *B62K 2202/00* (2013.01); *B62K 2204/00* (2013.01)

(58) Field of Classification Search
  CPC .................. B60K 7/00; B60K 7/0007; B60K 2007/0038; B60K 2007/0092
  See application file for complete search history.

(56) References Cited

U.S. PATENT DOCUMENTS

| | | | | |
|---|---|---|---|---|
| 5,515,934 | A * | 5/1996 | Davis | B25J 5/007 180/15 |
| 6,112,843 | A * | 9/2000 | Wilcox | B60K 17/36 180/209 |
| 6,374,934 | B1 * | 4/2002 | Beck | B62D 63/02 180/65.51 |
| 6,571,892 | B2 * | 6/2003 | Kamen | A61G 5/061 180/21 |
| 6,915,878 | B2 * | 7/2005 | Kamen | A61G 5/04 180/6.5 |
| 7,426,970 | B2 * | 9/2008 | Olsen | A61G 5/046 180/65.1 |
| 7,717,200 | B2 * | 5/2010 | Kakinuma | A63C 17/08 180/218 |
| 8,141,890 | B2 * | 3/2012 | Hughes | B60G 21/007 180/210 |
| 8,662,228 | B2 * | 3/2014 | Hill | B62K 5/027 180/210 |
| D726,592 | S * | 4/2015 | Zhang | D12/107 |
| 9,126,497 | B2 * | 9/2015 | Heinzmann | B62K 11/007 |
| 9,873,476 | B2 * | 1/2018 | Etzelsberger | B62K 15/006 |
| 10,052,247 | B2 * | 8/2018 | Vereen, III | A61G 5/107 |
| 2004/0262055 | A1 * | 12/2004 | Bancroft | A61G 5/042 180/65.1 |
| 2006/0108156 | A1 * | 5/2006 | Heinzmann | B60L 15/2036 180/8.2 |
| 2006/0254840 | A1 * | 11/2006 | Strong | B60G 5/00 180/190 |
| 2006/0254841 | A1 * | 11/2006 | Strong | B60G 5/00 180/190 |
| 2008/0116665 | A1 | 5/2008 | Nakaizumi et al. | |
| 2012/0101703 | A1 | 4/2012 | Morita | |
| 2012/0138375 | A1 * | 6/2012 | Hughes | B60L 7/10 180/65.1 |
| 2014/0008138 | A1 | 1/2014 | Kim et al. | |
| 2014/0222267 | A1 * | 8/2014 | Stevens | B62K 11/007 701/22 |
| 2015/0042053 | A1 * | 2/2015 | Berndorfer | B62K 3/002 280/7.1 |
| 2018/0022412 | A1 * | 1/2018 | Etzelsberger | B60K 7/0007 |

FOREIGN PATENT DOCUMENTS

| | | |
|---|---|---|
| JP | 2010-167809 A | 8/2010 |
| JP | 2012076671 A * | 4/2012 |
| JP | 5316640 B2 | 10/2013 |

\* cited by examiner

| ROTATION ANGLE $\theta$ (DEGREE) | $\theta_{MIN} - \theta_1$ | $\theta_1 - \theta_2$ | $\theta_2 - \theta_3$ | $\theta_3 - \theta_{MAX}$ |
|---|---|---|---|---|
| FORWARD TARGET SPEED (km/h) | 0 | 5.0 | 10.0 | 15.0 |
| BACKWARD TARGET SPEED (km/h) | 0 | 2.5 | 5.0 | 7.5 |

Fig. 7

TRAVELING APPARATUS

CROSS REFERENCE TO RELATED APPLICATIONS

This application is based upon and claims the benefit of priority from Japanese patent application No. 2016-178982, filed on Sep. 13, 2016, the disclosure of which is incorporated herein in its entirety by reference.

BACKGROUND

The present disclosure relates to a traveling apparatus on which a user rides and that travels.

Nowadays, personal mobility vehicles have been attracting attention. A personal mobility vehicle is often manufactured in a small size in view of maneuverability, which raises a problem that it lacks stability when traveling at a high speed. In order to improve stability of vehicles, including personal mobility vehicles but not limited thereto, vehicles having adjustable wheel base lengths have been suggested (e.g., Japanese Unexamined Patent Application Publication Nos. H1-106717 and 2005-231415).

SUMMARY

So far, personal mobility vehicles have been devised in regard to traveling forward, such as being able to adjust the wheel base length, but there has been little consideration given to traveling backward. In personal mobility vehicles for which some consideration has been given to traveling backward, an operation system for traveling backward is independent of an operation system for traveling forward. Thus, those personal mobility vehicles do not allow users to intuitively acquire driving operations.

The present disclosure has been made to solve such a problem and provides a traveling apparatus that provides an intuitive user interface to travel forward and backward.

An example aspect of the present disclosure is a traveling apparatus including at least, with respect to a traveling direction, a front wheel and a rear wheel and on which a user rides when traveling. The traveling apparatus includes: a front wheel supporting member configured to rotatably support the front wheel; a rear wheel supporting member configured to rotatably support the rear wheel; a driving unit configured to drive at least one of the front wheel and the rear wheel; an adjusting mechanism configured to adjust a wheel base length between the front wheel and the rear wheel by an action of the user being transmitted, thereby changing relative positions of the front wheel supporting member and the rear wheel supporting member; a command accept unit configured to accept a command for traveling forward or backward from the user; and a control unit configured to, while the command accept unit accepts the command for traveling forward, control the driving unit to drive the traveling apparatus to travel forward based on a forward target speed associated with the wheel base length in such a way that the greater the wheel base length, the greater the forward target speed becomes, and while the command accept unit accepts the command for traveling backward, control the driving unit to drive the traveling apparatus to travel backward based on a backward target speed associated with the wheel base length.

With such a configuration, it is possible to achieve simple and intuitive user interface in which, when a user who is an occupant moves his/her body to extend or retract a wheel base length, the traveling apparatus starts to travel in a direction in which the user has previously indicated.

According to the present disclosure, it is possible to provide a traveling apparatus that provides an intuitive user interface to travel forward and backward.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF DRAWINGS

FIG. 7 is a table showing a relationship between the rotation angle and target speed according to another example;

DESCRIPTION OF EMBODIMENTS

Hereinafter, although the present disclosure will be described with reference to embodiments of the present disclosure, the invention according to claims is not limited to the following embodiments. Moreover, all the components described in the following embodiments are not necessarily indispensable for means to solve problems.

Figure 1:
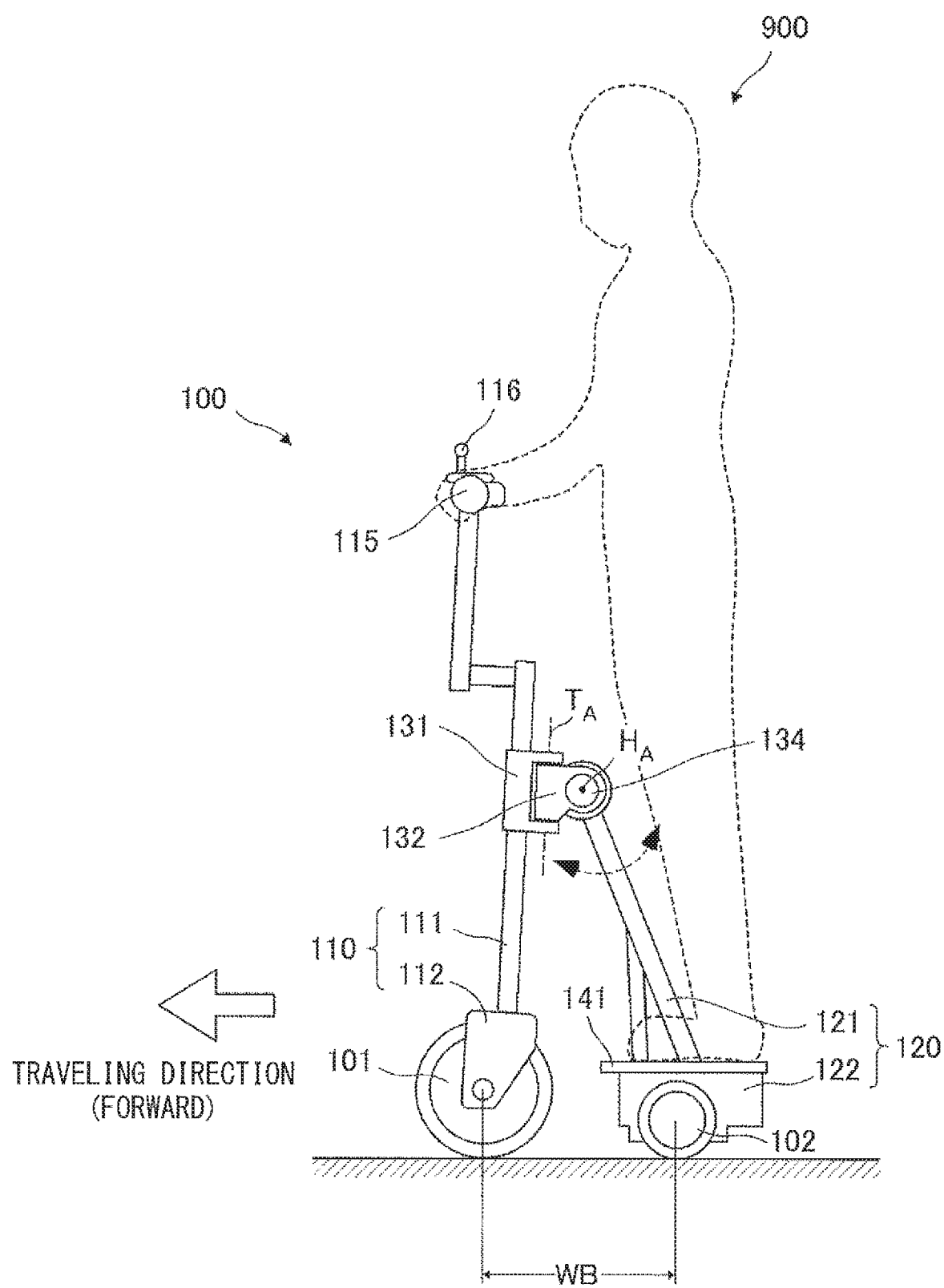
FIG. 1 is a lateral overview diagram of a traveling apparatus according to a first embodiment when it travels at a low speed.
Figure 2:
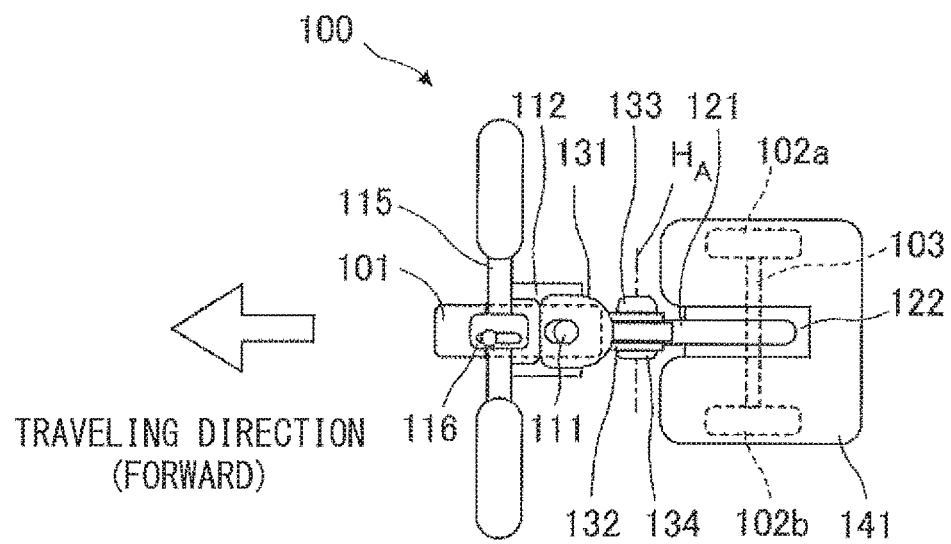
FIG. 2 is a top overview diagram of the traveling apparatus.

A first embodiment will be described below. FIG. 1 is a lateral overview diagram of a traveling apparatus 100 according to the first embodiment when it travels at a low speed. FIG. 2 is a top lateral diagram viewing from above the traveling apparatus 100 that is in the state shown in FIG. 1. In FIG. 2, a user 900, who is illustrated by the dotted line in FIG. 1, is not shown.

The traveling apparatus 100 is one kind of personal mobility vehicle and is an electrically operated mobile vehicle in which a user stands when he or she rides on the traveling apparatus 100. The traveling apparatus 100 includes, with respect to the traveling direction, one front wheel 101 and two rear wheels 102 (right rear wheel 102a and left rear wheel 102b). An orientation of the front wheel 101 is changed when the user 900 who is an occupant operates a handlebar 115. The front wheel 101 functions as a steering wheel. The right rear wheel 102a and left rear wheel 102b are coupled by a wheel axis 103 and driven by a motor and a deceleration mechanism (not shown). The right rear wheel 102a and the left rear wheel 102b function as driving wheels. The traveling apparatus 100 is grounded at three points by the three wheels and is a statically stable vehicle that is self-supported even when the traveling apparatus 100 is parked without the user 900 riding thereon.

The front wheel 101 is rotatably supported by a front wheel supporting member 110. The front wheel supporting member 110 includes a front pole 111 and a fork 112. The fork 112 is fixed to one end of the front pole 111 and sandwiches the front wheel 101 to rotatably support the front wheel 101 on both of its sides. The handlebar 115 is extended in the rotation axis direction of the front wheel 101 and fixed to the other end of the front pole 111. When the user 900 turns the handlebar 115, the front pole 111 transmits a force of the operation to the front wheel 101 to change its orientation.

The rear wheels 102 are rotatably supported by a rear wheel supporting member 120. The rear wheel supporting member 120 includes a rear pole 121 and a body part 122. The body part 122 fixes and supports one end of the rear pole 121 and rotatably supports the right rear wheel 102a and left rear wheel 102b with the wheel axis 103 interposed between the right rear wheel 102a and left rear wheel 102b. The body part 122 also functions as a housing that accommodates the above-mentioned motor and deceleration mechanism, and a battery etc. that supplies power to the motor. A step 141, for the user 900 to place his or her feet on, is provided on the upper surface of the body part 122.

The front wheel supporting member 110 and rear wheel supporting member 120 are coupled to each other with a pivot joint 131 and a hinge joint 132 interposed therebetween. The pivot joint 131 is fixed to the front pole 111 that constitutes the front wheel supporting member 110 at a position near the other end of the front pole 111 to which the handlebar 115 is fixed. Further, the pivot joint 131 is pivotally arranged on the hinge joint 132 and rotates in relation to the hinge joint 132 around a pivot axis $T_A$, which is disposed parallel to the direction in which the front pole 111 is extended. The hinge joint 132 is pivotally arranged on one end of the rear pole 121, which constitutes the rear wheel supporting member 120, that is opposite to an end of the rear pole 121 supported by the body part 122. The hinge joint 132 rotates in relation to the rear pole 121 around a hinge axis $H_A$, which is disposed parallel to the direction in which the wheel axis 103 is extended.

With such a structure, when the user 900 turns the handlebar 115, the front wheel supporting member 110 rotates around the pivot axis $T_A$ with respect to the rear wheel supporting member 120, so that the orientation of the front wheel 101 can be changed. Moreover, when the user 900 tilts the handlebar 115 forward in the traveling direction in which the traveling apparatus 100 travels forward, the tilting action is transmitted to the front wheel supporting member 110 and rear wheel supporting member 120 to thereby rotate the front wheel supporting member 110 and rear wheel supporting member 120 in relation to each other around the hinge axis $H_A$, so that an angle formed by the front pole 111 and rear pole 121 can be made smaller. When the angle formed by the front pole 111 and rear pole 121 is made small, a WB length, which is a distance of a wheel base (WB) between the front wheel 101 and rear wheels 102 will become shorter. On the contrary, when the user 900 tilts the handlebar 115 backward in the traveling direction in which the traveling apparatus 100 travels forward, the front wheel supporting member 110 and rear wheel supporting member 120 rotate in relation to each other around the hinge axis $H_A$, so that the angle formed by the front pole 111 and rear pole 121 can be made larger. When the angle formed by the front pole 111 and rear pole 121 increases, the WB length increases. That is, the user 900 can reduce or increase the WB length by performing an action as a rotation force.

A biasing spring 133 is attached to around the hinge joint 132. The biasing spring 133 is, for example, a torsion spring. The biasing force of the biasing spring 133 exerts a biasing force on the hinge axis $H_A$ and changes the angle formed by the front pole 111 and rear pole 121 to be a reference rotation angle when the user 900 is not in contact with the handlebar 115. On the other hand, the biasing force of the biasing spring 133 is configured in such a degree as to enable the user 900 to easily tilt the handlebar 115 backward in the traveling direction. Accordingly, the user 900 can adjust the angle formed by the front pole 111 and rear pole 121 and thus the WB length by changing at least one of a weight on the handlebar 115 and a weight on the step 141. That is, a mechanism for connecting the front pole 111 to the rear pole 121 with the hinge joint 132 interposed therebetween functions as an adjusting mechanism for the user 900 to adjust the WB length.

A rotation angle sensor 134 is attached to around the hinge joint 132. The rotation angle sensor 134 outputs the angle formed by the front pole 111 and rear pole 121 around the hinge axis $H_A$. That is, the rotation angle sensor 134 functions as a measuring unit for measuring relative positions of the front wheel supporting member 110 and rear wheel supporting member 120. The rotation angle sensor 134 is, for example, a rotary encoder. An output from the rotation angle sensor 134 is sent to a control unit, which will be described later.

Figure 3:
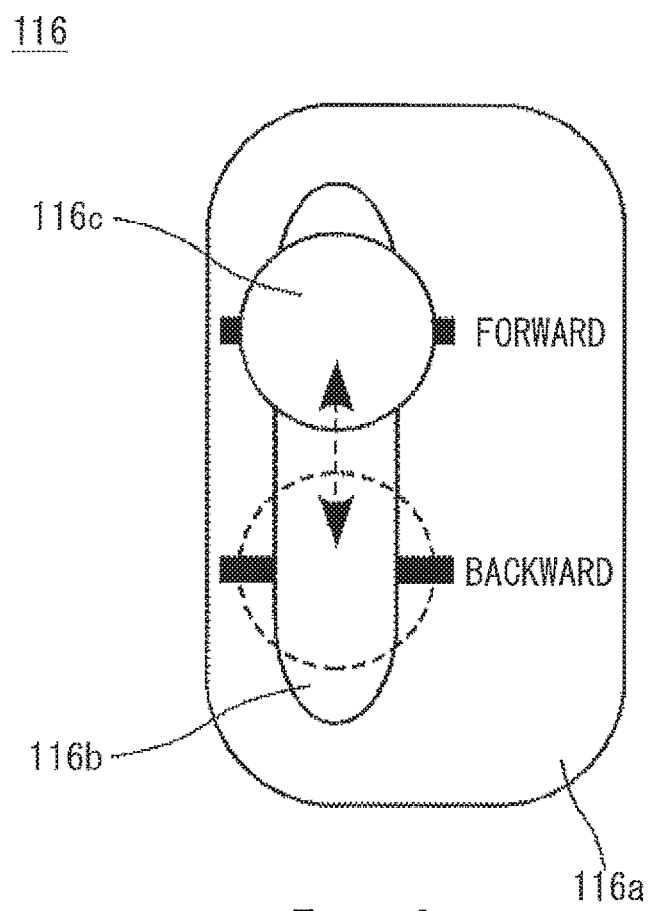
FIG. 3 is an overview diagram of a lever switch observed from above.

A lever switch 116 is provided near the center of the handlebar 115. FIG. 3 is an overview diagram of the lever switch 116 observed from above the traveling apparatus 100. The lever switch 116 is an operation member that functions as a command accept unit that accepts, from the user 900, a command to move the traveling apparatus 100 forward or backward.

The lever switch 116 mainly includes a panel 116a, a slide groove 116b, and a lever 116c. Two positions, "Forward" and "Backward" are printed on the panel 116a. The user 900 can grasp the lever 116c and slide it along the slide groove 116b to let the lever 116c stay in either "Forward" or "Backward". A control unit, which will be described later, detects the position of the lever 116c and determines whether to move the traveling apparatus 100 forward or backward. Details will be described later. Note that the operation member as the command accept unit is not limited to the lever switch, but may be another operation member as long as it can selectively indicate "Forward" or "Backward". For example, the operation member may be a push button or a touch panel.

Figure 4:
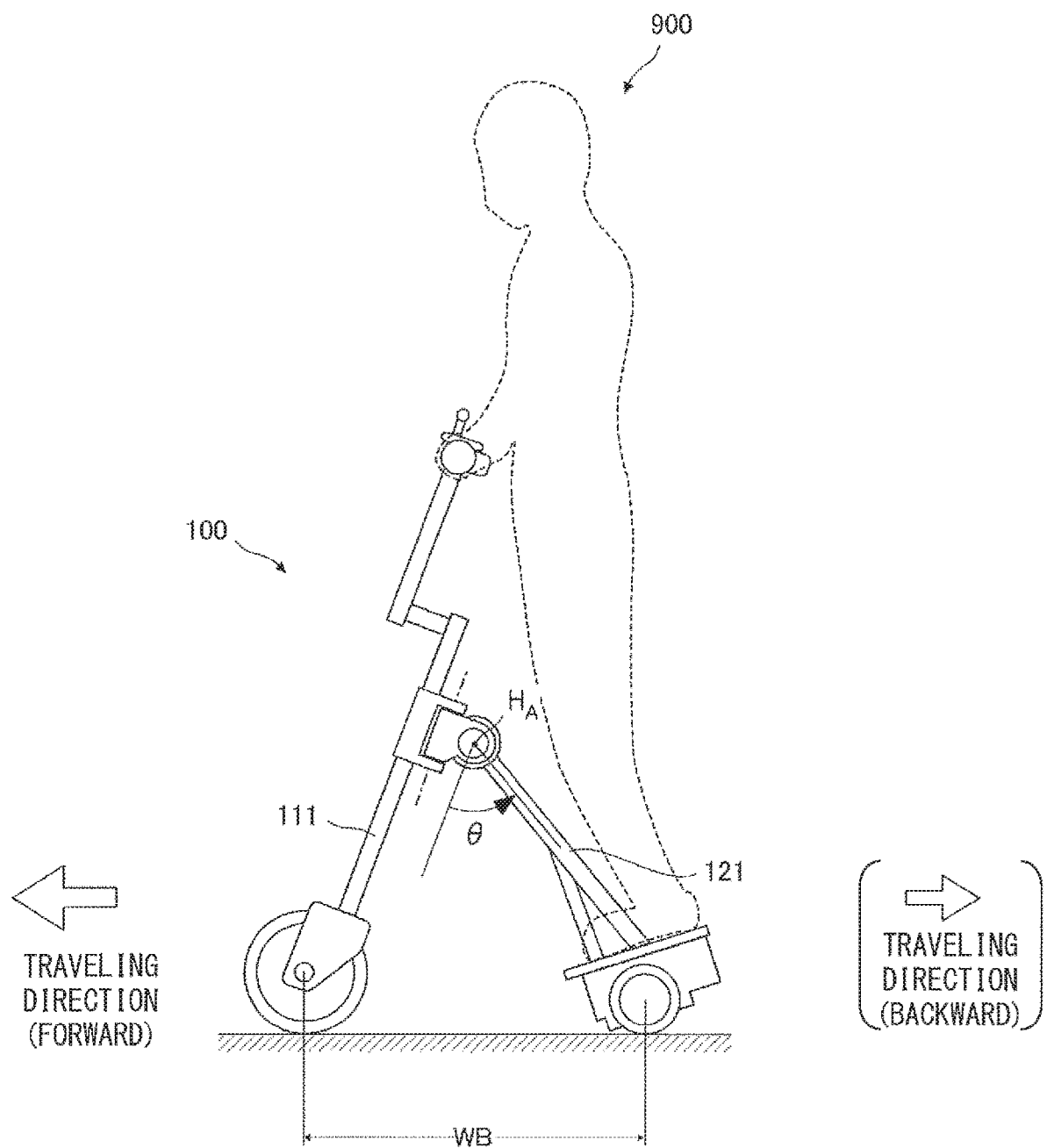
FIG. 4 is a lateral overview diagram of the traveling apparatus when it travels at a high speed.

The traveling apparatus 100 of this embodiment, whether it travels forward or backward, travels at a low speed when the WB length is short and travels at a high speed when the WB length is long. FIG. 1 shows a state of the traveling apparatus 100 with a short WB length traveling at a low speed. FIG. 4 is a lateral overview diagram of the traveling apparatus 100 shown in FIG. 1 and shows a state of the traveling apparatus 100 with a long WB length traveling at a high speed.

As shown in the drawings, a direction in which the angle formed by the front pole 111 and rear pole 121 relatively increases shall be positive, and a rotation angle shall be θ. Further, a minimum value the rotation angle θ can take (minimum angle) shall be $θ_{MIN}$, and a maximum value the rotation angle θ can take (maximum angle) shall be $θ_{MAX}$.

For example, $\theta_{MIN}$ is 10 degrees, and $\theta_{MAX}$ is 80 degrees. In other words, a structural control member is provided so that the rotation angle $\theta$ falls within a range between $\theta_{MIN}$ and $\theta_{MAX}$.

The WB length corresponds one-to-one to the rotation angle $\theta$ and can be calculated by the function, WB length=f($\theta$). Therefore, the WB length can be adjusted by changing the rotation angle $\theta$. The traveling apparatus 100 of this embodiment accelerates when the user 900 increases the rotation angle $\theta$ and decelerates when the user 900 reduces the rotation angle $\theta$. That is, the target speed is associated with the rotation angle $\theta$, and a change in the rotation angle $\theta$ causes the traveling apparatus 100 to accelerate/decelerate in order to reach the target speed associated with the changed rotation angle $\theta$.

When the rotation angle $\theta$ is reduced, the WB length becomes shorter, thereby improving maneuverability. That is, the traveling apparatus 100 can move around in a small space. On the contrary, when the rotation angle $\theta$ is increased, the WB length becomes longer, thereby improving travel stability, in particular, straight drivability. That is, the traveling apparatus 100 is less susceptible to sway caused by bumps and the like on the road even when traveling at a high speed. As the WB length is changed in conjunction with a change in the speed, the WB length will not be long when the traveling apparatus 100 is traveling at a low speed, and thus the traveling apparatus 100 can move in a projected area minimal at the low speed. That is, an area on the road necessary for the traveling apparatus 100 to travel in is small without requiring an excess area. As the user 900 can change both the speed and WB length in conjunction with each other when he/she tilts the handlebar 115 forward and backward, the driving operation is easy and simple.

Since the WB length is adjusted by transmitting an acting force generated by the action of the user 900, an actuator for adjusting the WB length is unnecessary. For this reason, the weight of the traveling apparatus 100 according to this embodiment is reduced as a whole. Accordingly, unlike the personal mobility vehicles of related art, the traveling apparatus 100 of this embodiment can provide convenience that enables the user 900 to, for example, easily bring it into a train.

Figure 5:
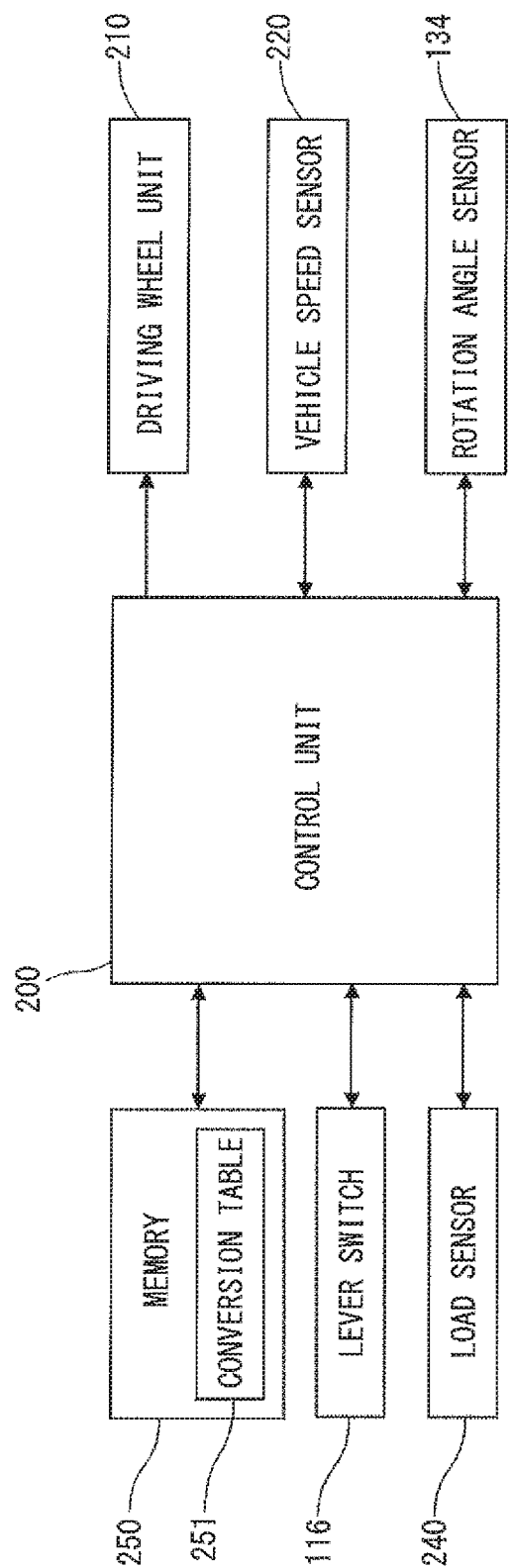
FIG. 5 is a control block diagram of the traveling apparatus according to the first embodiment.

Next, a system configuration of the traveling apparatus 100 will be described. FIG. 5 is a control block diagram of the traveling apparatus 100. A control unit 200 is, for example, a CPU and accommodated inside the body part 122. A driving wheel unit 210 includes a driving circuit and a motor for driving the rear 102, which are driving wheels. The driving wheel unit 210 is accommodated inside the body part 122. The control unit 200 sends driving signals to the driving wheel unit 210 to thereby control the rotations of the rear wheels 102.

The vehicle speed sensor 220 monitors an amount of the rotation of the rear wheels 102 or wheel axis 103 and detects the speed of the traveling apparatus 100. In response to a request from the control unit 200, the vehicle speed sensor 220 sends a result of the detection in a speed signal to the control unit 200. The rotation angle sensor 134 detects the rotation angle $\theta$ in the manner described above. In response to a request from the control unit 200, the rotation angle sensor 134 sends a result of the detection in a rotation angle signal to the control unit 200.

A load sensor 240 is, for example, a piezoelectric film that detects a load applied on the step 141, and is embedded in the step 141. In response to a request from the control unit 200, the load sensor 240 sends a result of the detection in a load signal to the control unit 200.

As described above, in response to a request from the control unit 200, the lever switch 116 sends a detection signal indicating whether the lever 116c is in the "Forward" position or the "Backward" position to the control unit 200. Based on the received detection signal, the control unit 200 determines whether the driving signal to be sent to the driving wheel unit 210 is to be a forward rotation signal for rotating the motor forwardly or a backward rotation signal for rotating the motor backwardly.

A memory 250 is a non-volatile storage medium and is, for example, a solid state drive. The memory 250 stores not only a control program for controlling the traveling apparatus 100 but also various parameter values, functions, lookup tables, and the like used for the control. The memory 250 stores a conversion table 251 for converting a rotation angle into a target speed.

Figure 6:
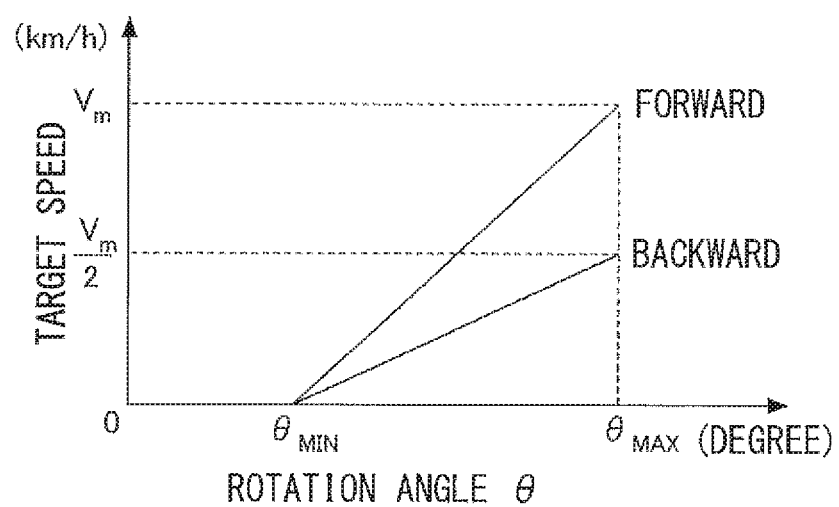
FIG. 6 is a graph showing a relationship between a rotation angle and a target speed.

FIG. 6 is a graph showing a relationship between the rotation angle $\theta$ and target speed as an example of the conversion table 251 for converting a rotation angle $\theta$ into a target speed. In FIG. 6, the horizontal axis represents the rotation angle $\theta$ (degrees), and the vertical axis represents the target speed (km/h). In FIG. 6, the linear function shown as "Forward" represents a forward target speed with respect to the rotation angle $\theta$, which is applied when the lever switch 116 indicates "Forward". Further, the linear function shown as "Backward" represents a backward target speed with respect to the rotation angle $\theta$, which is applied when the lever switch 116 indicates "Backward". These target speeds are expressed by positive values as a travel distance per unit time, regardless of whether the traveling apparatus 100 travels forward or backward.

The forward target speed is configured to become greater as the rotation angle $\theta$ increases, i.e., as the WB length becomes longer. The target speed is zero at the minimum angle $\theta_{MIN}$ (degree), and the target speed is $V_m$(km/h) at the maximum angle $\theta_{MAX}$ (degree). The backward target speed is also configured to become greater as the rotation angle $\theta$ increases, i.e., as the WB length becomes longer. The target speed is zero at the minimum angle $\theta_{MIN}$ (degree), and the target speed is $V_m/2$ (km/h) at the maximum angle $\theta_{MAX}$ (degree). In this case, a target maximum speed in the case of traveling backward is configured to be half of the target maximum speed in the case of traveling forward. However, these maximum speeds can be arbitrarily configured according to the performance and the like of the traveling apparatus 100. In consideration of the efficiency of traveling and the stability of posture when the user 900 rides on the traveling apparatus 100, it is preferable to configure the target maximum speed in the case of traveling backward to be less than the target maximum speed in the case of traveling forward.

When the lever switch 116 is positioned in "Forward", the control unit 200 determines the forward target speed based on the current rotation angle $\theta$ adjusted by the user 900, and sends the driving signal for forward rotation to the driving wheel unit 210 so that the current speed follows the target speed. Likewise, when the lever switch 116 is positioned in "Backward", the control unit 200 determines the backward target speed based on the current rotation angle $\theta$ adjusted by the user 900, and sends the driving signal for backward rotation to the driving wheel unit 210 so that the current speed follows the target speed.

In this way, if the rotation angle $\theta$ and the target speed can be associated by a function, the conversion table 251 may be described in the form of a function. The conversion table 251 described in the form of a function is stored in the memory 250 and is referred to as appropriate.

FIG. 7 is a table showing a relationship between the rotation angle θ and the target speed as another example of the conversion table 251 for converting a rotation angle θ into a target speed. In the example of FIG. 7, the continuously varying rotation angle θ is divided into a plurality of groups, and one forward target speed and one backward target speed are associated with each group. Note that the target speed is expressed by a positive value as a travel distance per unit time, regardless of whether the traveling apparatus 100 travels forward or backward.

As shown in FIG. 7, in regard to the forward target speed, the target speed 0 (km/h) is associated with the group of rotation angle θ in the range between $θ_{MIN}$ or greater and less than $θ_1$, the target speed 5.0 (km/h) is associated with the group of rotation angle θ in the range between $θ_1$ or greater and less than $θ_2$, the target speed 10.0 (km/h) is associated with the group of rotation angle θ in the range between $θ_2$ or greater and less than $θ_3$, and the target speed 15.0 (km/h) is associated with the group of rotation angle θ in the range between $θ_3$ or greater and less than $θ_{MAX}$. Moreover, in regard to the backward target speed, the target speed 0 (km/h) is associated with the group of rotation angle θ in the range between $θ_{MIN}$ or greater and less than $θ_1$, the target speed 2.5 (km/h) is associated with the group of rotation angle θ in the range between $θ_1$ or greater and less than $θ_2$, the target speed 5.0 (km/h) is associated with the group of rotation angle θ in the range between $θ_2$ or greater and less than $θ_3$, and the target speed 7.5 (km/h) is associated with the group of rotation angle θ in the range between $θ_3$ or greater and less than $θ_{MAX}$. Note that in this case, in all of the groups, the backward target speed is configured to be half of the forward target speed. However, these target speeds can be arbitrarily configured according to the performance and the like of the traveling apparatus 100.

The conversion table 251 in this case can employ the lookup table format. Like in the above example, when the target speed is associated with a somewhat broad range of the rotation angles θ, the target speed will not change little by little, for example, as a result of being affected by swinging of the user 900's body, and it is thus expected that the speed will be smoothly changed. It is obvious that hysteresis may be included in the boundaries between the ranges of the above rotation angles, and by setting different boundaries of the ranges of these angles at the time of acceleration and deceleration, it is expected that the speed will be changed more smoothly.

The association between the rotation angle θ and target speed is not limited to the examples of FIGS. 6 and 7, and various other associations may be formed. As an example of the association, the amount of a change in the target speed for the amount of a change in the rotation angle θ may be configured to be small in a low-speed region, while the amount of a change in the target speed for the amount of a change in the rotation angle θ may be configured to be large in a high-speed region. Moreover, in this embodiment, although the conversion table 251 for associating the rotation angle θ, which is a parameter, with the target speed because the rotation angle θ corresponds one-to-one to the WB length is employed, a conversion table for associating the WB length with the target speed according to the original purpose of the conversion table may be employed instead. In this case, a rotation angle θ obtained by the rotation angle sensor 134 may be converted into a WB length by using the above function, and the conversion table may be referred to.

Figure 8:
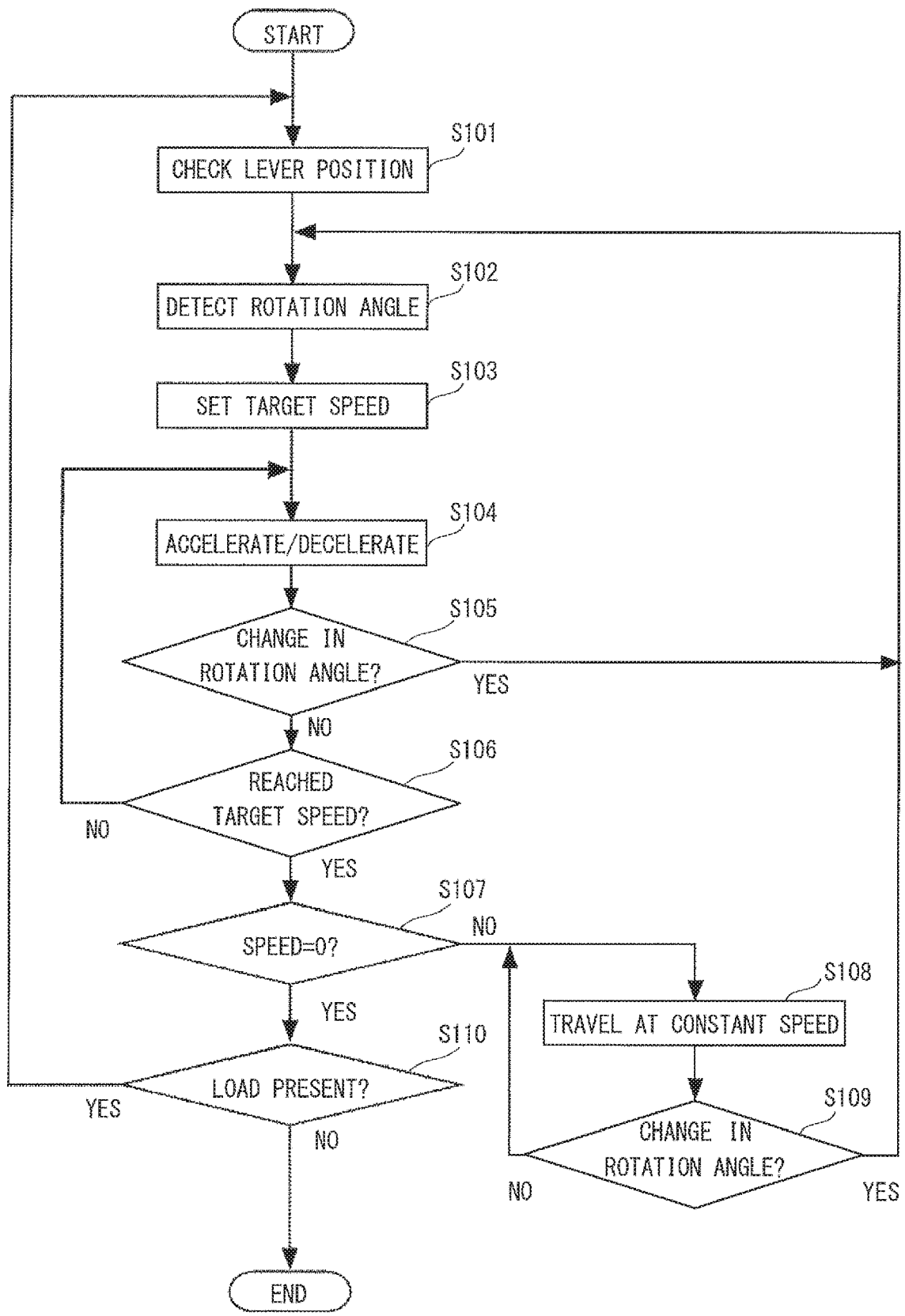
FIG. 8 is a flowchart showing a process while the traveling apparatus is traveling.

Next, a traveling process according to this embodiment will be described. FIG. 8 is a flowchart showing a process performed while the traveling apparatus 100 is traveling. The flow starts when a power switch is turned on and a signal indicating that a load is present is received from the load sensor 240, i.e., when the user 900 rides on the traveling apparatus 100.

In Step S101, the control unit 200 checks the lever position of the lever switch 116. When the lever position is the "Forward" position, the control unit 200 performs forward control, while when the lever position is in the "Backward" position, it performs backward control.

The control unit 200 proceeds to Step S102, obtains the rotation angle signal from the rotation angle sensor 134, calculates the current rotation angle θ. In Step S103, the calculated rotation angle θ is applied to the conversion table 251, which has been read out from the memory 250, to set the forward target speed or the backward target speed according to a result of the check in Step S101.

When the control unit 200 sets the target speed, it proceeds to Step S104 and sends a driving signal for acceleration or deceleration to the driving wheel unit 210. Specifically, the control unit 200 firstly receives the speed signal from the vehicle speed sensor 220 and checks the current speed. If the target speed is greater than the current speed, the control unit 200 sends the driving signal for acceleration to the driving wheel unit 210, whereas if the target speed is less than the current speed, the control unit 200 sends the driving signal for deceleration to the driving wheel unit 210.

The control unit 200 monitors whether or not the rotation angle θ has changed during acceleration or deceleration (Step S105). If the control unit 200 determines that the rotation angle θ has changed, it starts the process from Step S102 again. If the control unit 200 determines that the rotation angle θ has not changed, it proceeds to Step S106. Note that when the conversion table shown in FIG. 7 is employed, if changes in the rotation angle θ are within one group, it is determined that the rotation angle θ has not changed.

In Step S106, the control unit 200 receives the speed signal from the vehicle speed sensor 220 and evaluates as to whether or not the current speed has reached the target speed. If the control unit 200 determines that the current speed has not reached the target speed, it returns to Step S104, and the acceleration or deceleration is continued. If the control unit 200 determines that the current speed has reached the target speed, it proceeds to Step S107. In Step S107, the control unit 200 checks whether or not the target speed is zero. If the target speed is zero, it means that the traveling apparatus 100 is stopped at the time of Step S107. Otherwise, the traveling apparatus 100 is traveling at the target speed, and thus the control unit 200 sends, to the driving wheel unit 210, the driving signal for maintaining the traveling apparatus 100 to travel at the speed (Step S108).

Even while the traveling apparatus 100 is traveling at a constant speed in Step S108, the control unit 200 monitors whether or not the rotation angle θ has changed (Step S109). If the control unit 200 determines that the rotation angle θ has changed, it returns to Step S102. If the control unit 200 determines that the rotation angle θ has not changed, it returns to Step S108 to continue traveling at the constant speed.

If the control unit 200 confirms that the target speed is zero in Step S107, it proceeds to Step S110 and evaluates whether the user 900 gets off the traveling apparatus 100 based on the load signal received from the load sensor 240.

If the control unit 200 determines that the user 900 has not got off the traveling apparatus 100, i.e., determines that a load is present, it returns to Step S101 to continue the travel control. The control unit 200 returns to Step S101 because the lever switch 116 accepts an operation of the user 900 when the speed becomes zero in Step S107. The control unit 200 returns to Step S101 in order to check whether the lever switch 116 is operated by the user 900 and the traveling direction is reversed.

In this embodiment, the lever switch 116 accepts the operation only when the speed of the traveling apparatus 100 has become zero and not while the traveling apparatus 100 is traveling. Since the operation of the lever switch 116 is accepted when the speed becomes zero as described above, it is possible to prevent the driving signal for backward rotation from being sent while the driving wheels are being rotated and to thereby prevent an excessive load from being applied to a driving system. The lever switch 116 is configured, for example, in the following manner. While a traveling signal is being received, the lever 116c is locked, prevent it from being slid. When the speed becomes zero and the traveling signal is stopped, the lever 116c is unlocked, enabling it to be slid. If the operating member is a push button instead of a lever switch, when the speed is zero, the push button may be lit to indicate that it is possible to give a command for reversing the direction and may accept the command from the user 900 only when it is lit.

The speed at which the lever switch 116 accepts the operation may be, for example, specified as a range of speeds, such as a range of speeds less than 1.0 km/h, where the load on the driving system is acceptable. In other words, it may be configured in such a way that the operation is not accepted if the speed is not less than a predetermined speed. Further, in this embodiment, the condition under which the lever switch 116 accepts the operation is defined by the speed using the output of the vehicle speed sensor 220. However, such a condition may be defined based on other parameters. For example, the WB length may be used as the parameter. In this case, it may be configured in such a way that when a detected current WB length is not shorter than a predetermined WB length, the operation of the operation member is not accepted.

In Step S110, if the control unit 200 determines that the user 900 has got off the traveling apparatus 100, a series of operations is ended. The control unit 200 powers off the traveling apparatus 100.

Figure 9:
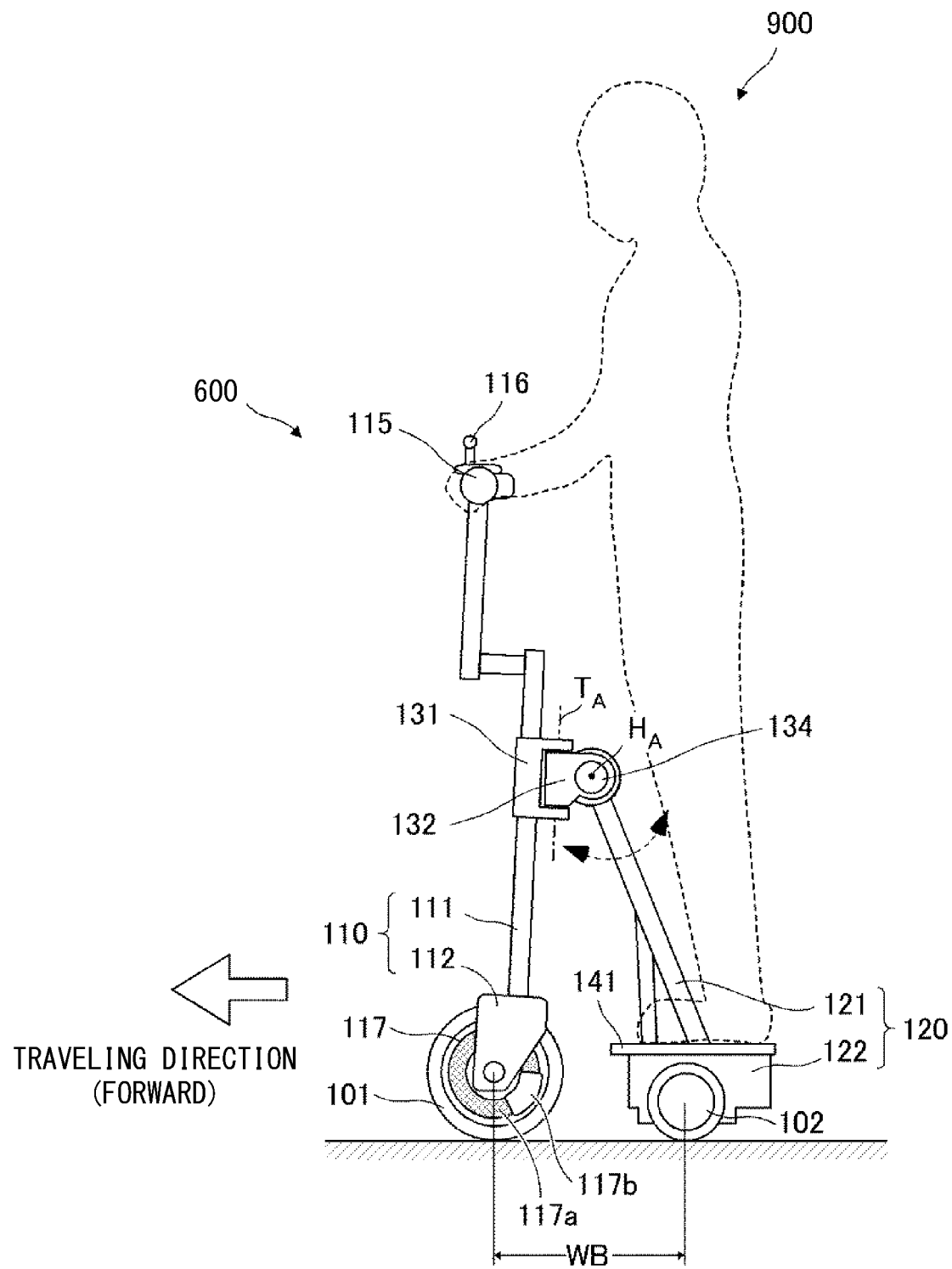
FIG. 9 is a lateral overview diagram of a traveling apparatus according to a second embodiment when it travels at a low speed.

Next, a second embodiment will be described. FIG. 9 is a lateral overview diagram of a traveling apparatus 600 according to the second embodiment when it travels at a low speed. The traveling apparatus 600 mainly differs from the traveling apparatus 100 of the first embodiment in that a disk brake 117 is included in the front wheel 101 and that the backward target speed is constant. The elements of the traveling apparatus 600 according to the second embodiment serving the same function as those of the traveling apparatus 100 of the first embodiment are denoted by the same reference signs as those in the first embodiment. The descriptions of such elements will be thus omitted here. Further, the configuration of the control block and the processing flow of the traveling apparatus 600 are almost the same as those of the traveling apparatus 100. Accordingly, in the following description, only the difference between the traveling apparatuses 600 and 100 will be focused on.

The front wheel 101 includes the disk brake 117 as a braking member that brakes rotation of the front wheels 101. In the disk brake 117, in response to a signal from the control unit 200, a brake pad 117b is used to sandwich a disk 117a attached to the inside of the wheel to generate friction, thereby reducing a rotation speed of the front wheel 101.

Figure 10:
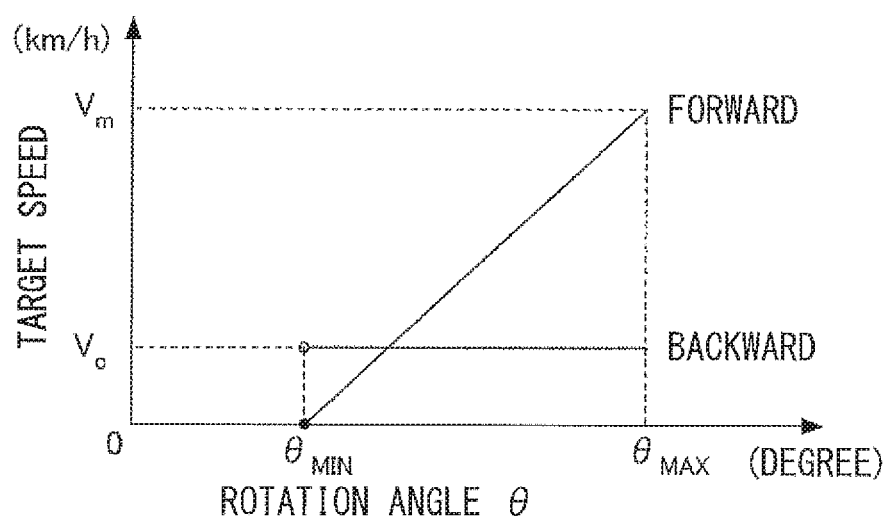
FIG. 10 is a graph showing a relationship between the rotation angle and the target speed.

FIG. 10 is a graph showing a relationship between the rotation angle and the target speed in this embodiment. In FIG. 10, the horizontal axis represents the rotation angle θ (degrees), and the vertical axis represents the target speed (km/h). In FIG. 10, the linear function shown as "Forward" represents a forward target speed with respect to the rotation angle θ, which is applied when the lever switch 116 indicates "Forward". Further, the linear function shown as "Backward" represents a backward target speed with respect to the rotation angle θ, which is applied when the lever switch 116 indicates "Backward". Note that these target speeds are expressed by positive values as a travel distance per unit time, regardless of whether the traveling apparatus travels forward or backward.

Like in FIG. 6, the forward target speed is configured to become greater as the rotation angle θ increases, i.e., as the WB length becomes longer. The target speed is zero at the minimum angle $\theta_{MIN}$ (degree), and the target speed is $V_m$ (km/h) at the maximum angle $\theta_{MAX}$ (degree). When the rotation angle θ is the minimum value $\theta_{MIN}$, the backward target speed is zero, while when the rotation angle θ is greater than the minimum value $\theta_{MIN}$, the backward target speed is a constant value $V_c$ (km/h).

That is, while the traveling apparatus 600 travels forward, when the rotation angle θ is increased and the WB length becomes longer, the target speed is proportionally increased. However, while the traveling apparatus 600 travels backward, the target speed is kept constant even if the WB length becomes longer. Depending on the purpose of use of the traveling apparatus 600, there are cases where it is not necessary to travel at a high speed when traveling backward. In such a case, it is preferable to configure the traveling apparatus 600 in such a way that the backward speed will stay the same, laying stress on stability. Moreover, when the traveling apparatus 600 travels backward, the user 900 can easily lose his/her the balance as he/she drives while often turning back. However, there is no such fear if the WB length is increased while the traveling apparatus 600 travels backward. In this embodiment, since the backward speed is not increased even if the WB length is increased, the user 900 can easily maintain his/her balance.

Figure 11A:
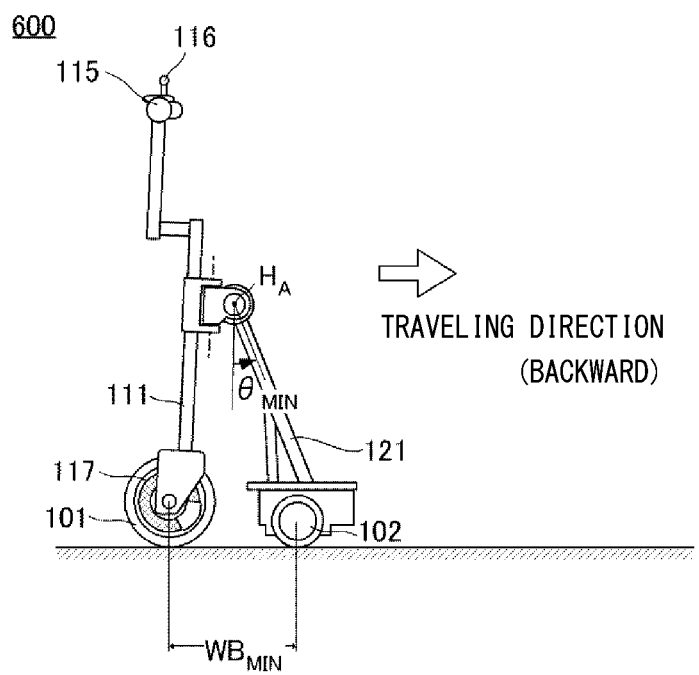
FIGS. 11A and 11B are drawings for describing a change in a WB length when a front wheel is braked.
Figure 11B:
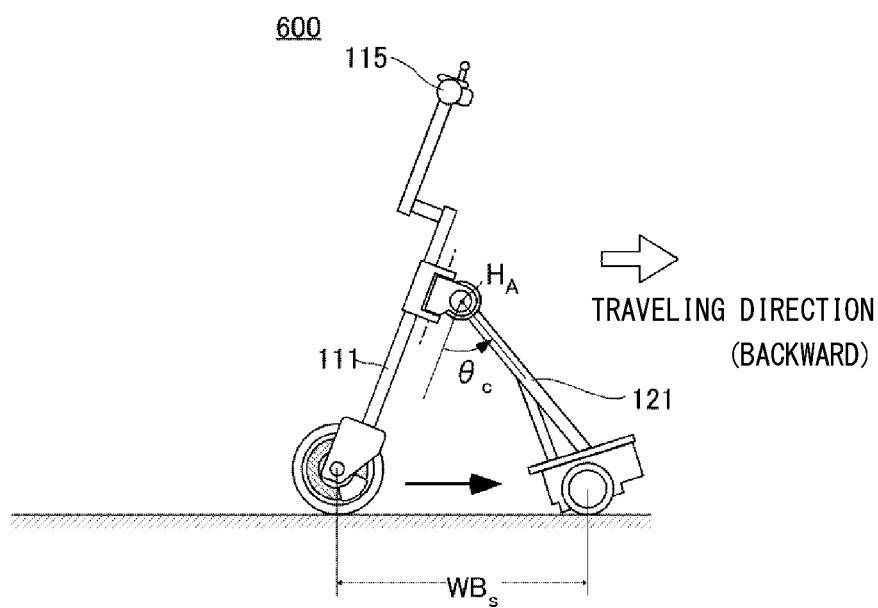

In this embodiment, the traveling apparatus 600 extends the WB length so that the user 900 can easily maintain his/her balance without intentionally adjusting the adjusting mechanism. FIGS. 11A and 11B are drawings for describing a change in the WB length when the front wheel is braked.

The control unit 200 activates the disc brake 117 when the traveling apparatus travels 600 backward. To be more specific, the control unit 200 does not completely stop the rotation of the front wheel 101 by the disc brake 117 and instead it holds down the rotation of the front wheel 101 in order to reduce the rotation speed of the front wheel 101 to be less than the rotation speed of the rear wheels 102, which are the driving wheels.

FIG. 11A shows a state of the traveling apparatus 600 when it starts to travel backward. Since it is the time for the traveling apparatus 600 to start traveling backward, as described above, the rotation angle θ is the minimum value $\theta_{MIN}$ and the WB length is the minimum value $WB_{MIN}$. When the rear wheels 102 start backward rotation in this state, the traveling apparatus 600 starts traveling backward. However, at the same time, braking of the disk brake 117 is also started.

Then, the rotation speed of the front wheel 101 becomes less than the rotation speed of the rear wheels 102, the front pole 111 and rear pole 121 start to rotate in relation to each other around the hinge axis $H_4$, and the rotation angle θ gradually increases. FIG. 11B shows a state of the traveling apparatus 600 at a point sometime after the traveling apparatus 600 started to travel backward. As shown in FIG. 11B, the rotation angle θ becomes $θ_c$ which is greater than $θ_{MIN}$, and the WB length is also extended to become $WB_c$. When the disc brake 117 is activated while the traveling apparatus 600 travels backward in this way, the WB length is naturally extended without having the user 900 operate the handlebar while he/she is looking back. Thus there is less possibility that the user 900 loses his/her balance.

In this embodiment, the disc brake 117 is used as the braking member for braking the rotation of the front wheel 101 while the traveling apparatus 600 travels backward. However, the disk brake 117 may be another member as long as it gives rotational resistance to the front wheel 101. For example, the disk brake 117 may be a one-way rotary damper that acts only when the front wheel 101 is rotated backwardly. Moreover, the disc brake 117 may be used as a brake when the traveling apparatus 600 travels forward. In this case, it is preferable to provide a brake lever on the handlebar 115 so that the disc brake 117 is activated when gripped by the user.

The first and second embodiments have been described so far. The conversion table for setting the target speed to a constant value when the traveling apparatus travels backward, which has been described with reference to FIG. 10 in the second embodiment, may be employed in the traveling apparatus 100 according to the first embodiment. If it is not necessary to travel backward at a high speed, it is desirable to travel backward at a constant low speed. It may be configured in such a way that a user who is an occupant is enabled to select the conversion table as to how to set the target speed when the traveling apparatus travels backward.

The front and rear wheels may not be wheels and may instead be ground-contacting elements such as spherical wheels, a crawler, or the like. Moreover, a power source for driving the driving wheels is not limited to a motor and instead may be a gasoline engine or the like.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A traveling apparatus including at least, with respect to a traveling direction, a front wheel and a rear wheel and on which a user rides when traveling, the traveling apparatus comprising:
   a front wheel supporting member configured to rotatably support the front wheel;
   a rear wheel supporting member configured to rotatably support the rear wheel;
   a driving unit configured to drive at least one of the front wheel and the rear wheel;
   an adjusting mechanism configured to adjust a wheel base length between the front wheel and the rear wheel by changing relative positions of the front wheel supporting member and the rear wheel supporting member by the user's force of operation, wherein the user's force of operation includes changing a magnitude and/or angle of force on at least one of a handlebar or a step of the traveling apparatus thereby causing a change in the relative positions; wherein the user's force of operation includes changing a user's weight on at least one of a handlebar or a step of the traveling apparatus;
   a command accept unit configured to accept a command for traveling forward or backward from the user; and
   a control unit configured to, while the command accept unit accepts the command for traveling forward, control the driving unit to drive the traveling apparatus to travel forward based on a forward target speed associated with the wheel base length in such a way that the greater the wheel base length, the greater the forward target speed becomes, and while the command accept unit accepts the command for traveling backward, control the driving unit to drive the traveling apparatus to travel backward based on a backward target speed associated with the wheel base length.

2. The traveling apparatus according to claim 1, wherein the backward target speed is associated with the wheel base length in such a way that the backward target speed is a fixed speed except when the wheel base length is shortest and that the target speed is a speed 0 when the wheel base length is shortest.

3. The traveling apparatus according to claim 2, further comprising a braking member configured to brake rotation of the front wheel, wherein the driving unit drives the rear wheel.

4. The traveling apparatus according to claim 1, wherein the backward target speed is associated with the wheel base length in such a way that the greater the wheel base length, the greater the backward target speed becomes.

5. The traveling apparatus according to claim 1, wherein the command accept unit does not accept a switching operation between traveling forward and traveling backward when the wheel base length is not shorter than a predetermined length.

6. The traveling apparatus according to claim 1, wherein the command accept unit does not accept a switching operation between traveling forward and traveling backward when a speed of the traveling apparatus is not less than a predetermined speed.

* * * * *